United States Patent
Okubo

(10) Patent No.: US 7,656,435 B2
(45) Date of Patent: Feb. 2, 2010

(54) IMAGE PROCESSING APPARATUS AND PIXEL-EXTRACTION METHOD THEREFOR

(75) Inventor: Toshiyuki Okubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 673 days.

(21) Appl. No.: 11/027,396

(22) Filed: Dec. 30, 2004

(65) Prior Publication Data
US 2005/0146624 A1 Jul. 7, 2005

(30) Foreign Application Priority Data
Jan. 7, 2004 (JP) ............... 2004-002106

(51) Int. Cl.
H04N 9/73 (2006.01)
H04N 5/228 (2006.01)

(52) U.S. Cl. .............. 348/225.1; 348/222.1; 348/223.1

(58) Field of Classification Search .............. 348/223.1, 348/224.1, 225.1, 187, 216.1, 222.1, 226.1, 348/227.1, 228.1, 255, 370, 371; 358/516, 358/417
See application file for complete search history.

(56) References Cited

U.S. PATENT DOCUMENTS

| 5,568,194 | A | | 10/1996 | Abe | |
|---|---|---|---|---|---|
| 6,069,972 | A | * | 5/2000 | Durg et al. | 382/167 |
| 6,739,767 | B2 | * | 5/2004 | Ikeda et al. | 396/567 |
| 7,336,314 | B2 | * | 2/2008 | Yamada | 348/371 |
| 2002/0130959 | A1 | * | 9/2002 | McGarvey | 348/223 |
| 2002/0150306 | A1 | * | 10/2002 | Baron | 382/275 |

FOREIGN PATENT DOCUMENTS

| JP | 2000-350232 A | 12/2000 |
|---|---|---|
| JP | 2003-030647 A | 1/2003 |

OTHER PUBLICATIONS

Chinese Office Action dated Aug. 10, 2007.
The above reference was cited in a Nov. 27, 2009 Japanese Office Action a copy of which is enclosed without English Translation, that issued in Japanese Patent Application No. 2004-002106.

* cited by examiner

*Primary Examiner*—Sinh Tran
*Assistant Examiner*—Albert H Cutler
(74) *Attorney, Agent, or Firm*—Cowan, Liebowitz & Latman, P.C.

(57) ABSTRACT

By sensing an object without performing light projection with a light projection unit, a first image is acquired, and by sensing the object while performing light projection with the light projection unit, a second image is acquired. Based on the acquired first image and the second image, a pixel having a specific color in the first image is extracted.

13 Claims, 10 Drawing Sheets

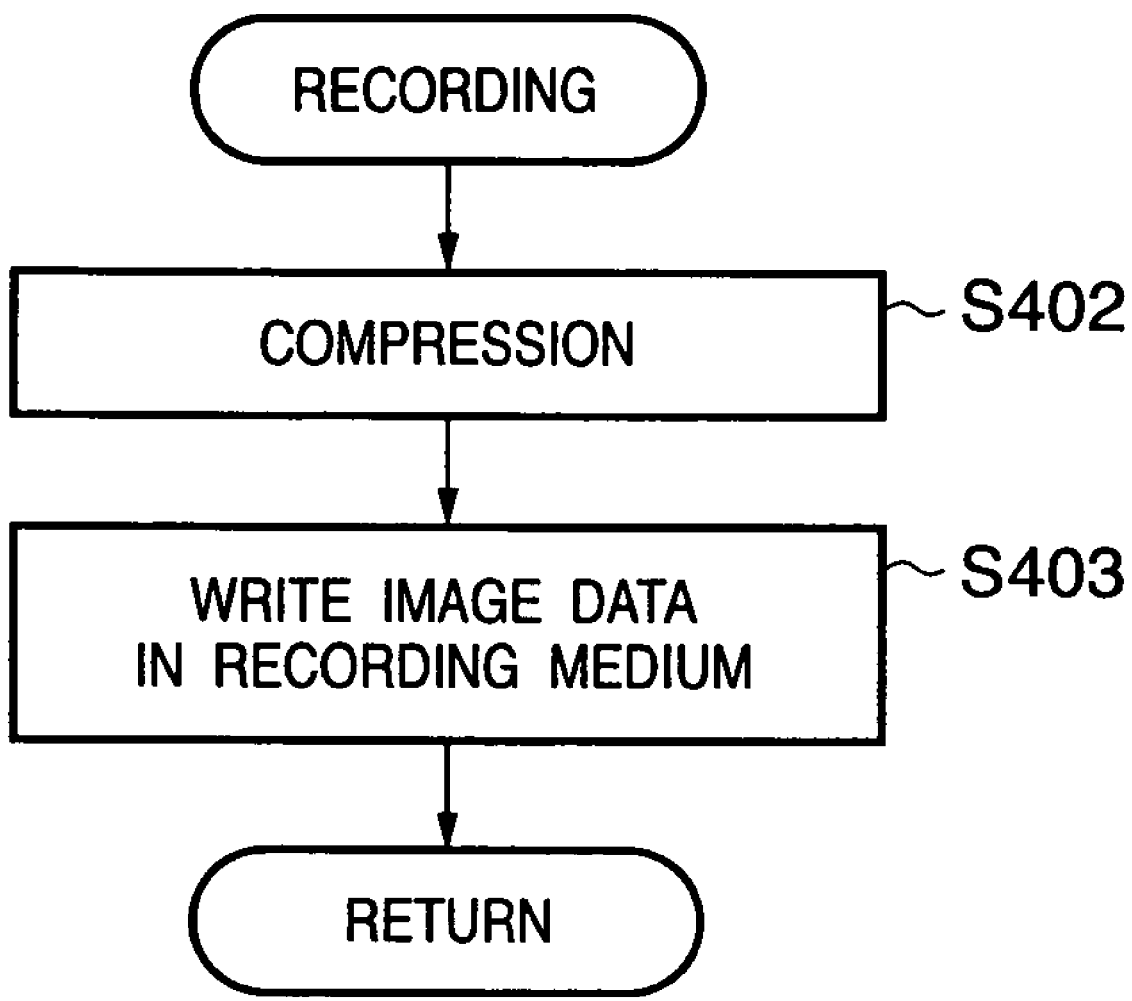

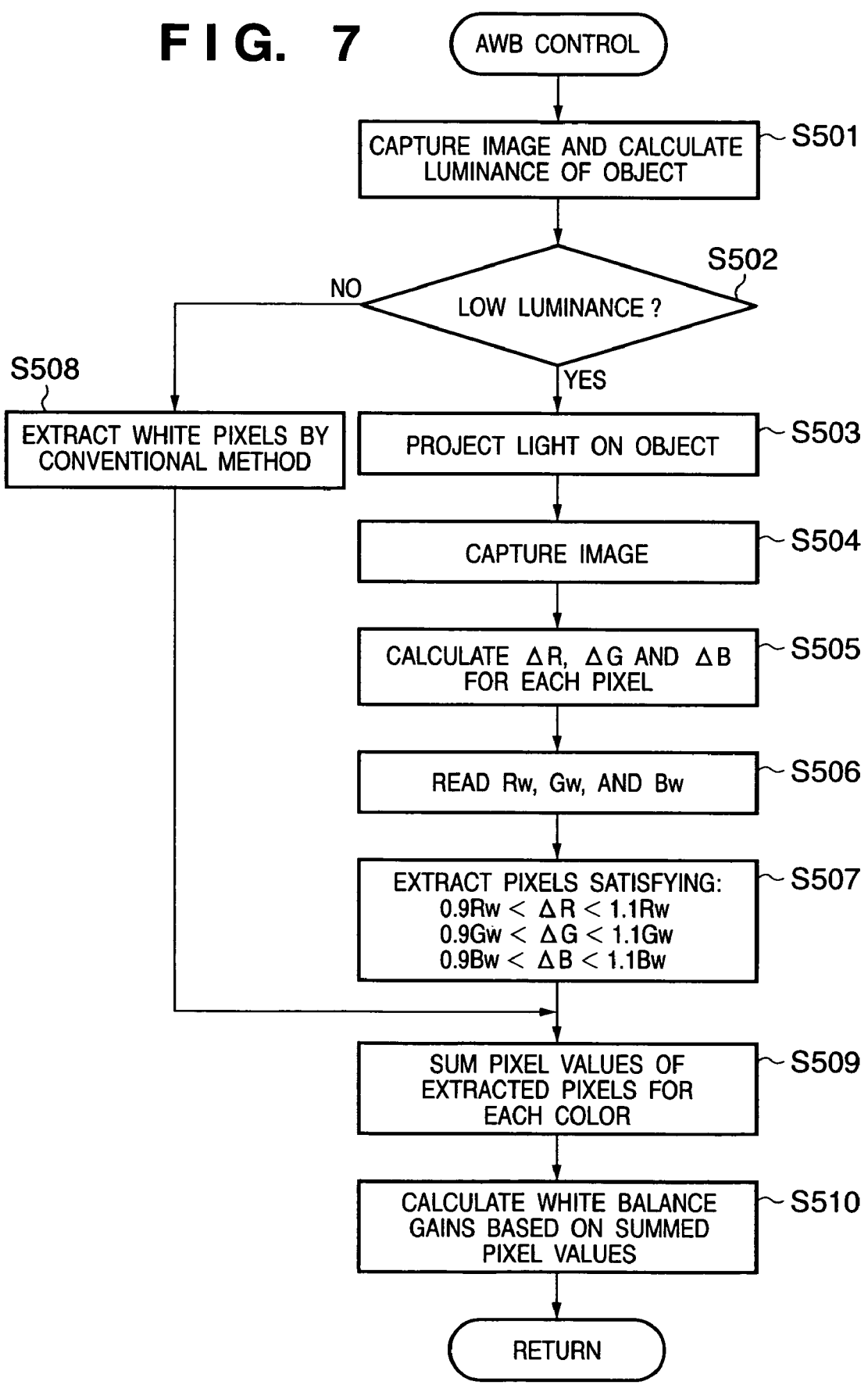

1.1Rw, 1.1Gw, 1.1Bw
Rw, Gw, Bw
0.9Rw, 0.9Gw, 0.9Bw

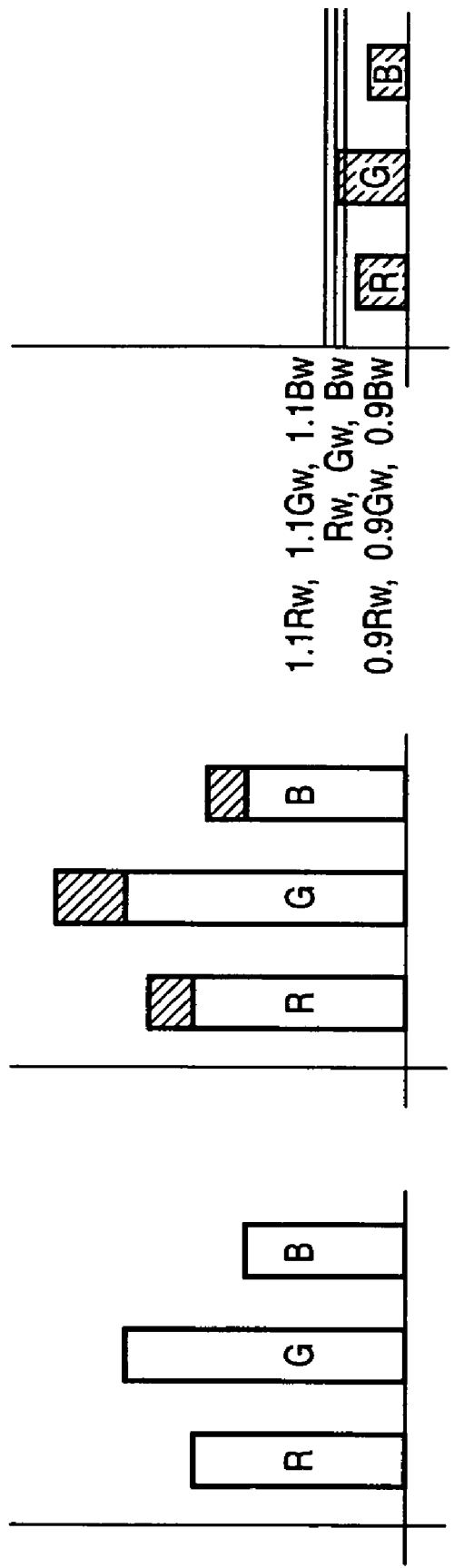

FIG. 10

| R | G | R | G | R | G | R | G | R | G | R | G | R | G | R | G |
|---|---|---|---|---|---|---|---|---|---|---|---|---|---|---|---|
| G | B | G | B | G | B | G | B | G | B | G | B | G | B | G | B |
| R | G | R | G | R | G | R | G | R | G | R | G | R | G | R | G |
| G | B | G | B | G | B | G | B | G | B | G | B | G | B | G | B |
| R | G | R | G | R | G | R | G | R | G | R | G | R | G | R | G |
| G | B | G | B | G | B | G | B | G | B | G | B | G | B | G | B |
| R | G | R | G | R | G | R | G | R | G | R | G | R | G | R | G |
| G | B | G | B | G | B | G | B | G | B | G | B | G | B | G | B |
| R | G | R | G | R | G | R | G | R | G | R | G | R | G | R | G |
| G | B | G | B | G | B | G | B | G | B | G | B | G | B | G | B |
| R | G | R | G | R | G | R | G | R | G | R | G | R | G | R | G |
| G | B | G | B | G | B | G | B | G | B | G | B | G | B | G | B |
| R | G | R | G | R | G | R | G | R | G | R | G | R | G | R | G |
| G | B | G | B | G | B | G | B | G | B | G | B | G | B | G | B |
| R | G | R | G | R | G | R | G | R | G | R | G | R | G | R | G |
| G | B | G | B | G | B | G | B | G | B | G | B | G | B | G | B |
| R | G | R | G | R | G | R | G | R | G | R | G | R | G | R | G |

IMAGE PROCESSING APPARATUS AND PIXEL-EXTRACTION METHOD THEREFOR

FIELD OF THE INVENTION

The present invention relates to an image processing method and an image processing apparatus.

BACKGROUND OF THE INVENTION

Conventionally, image processing apparatuses, e.g., electronic cameras or the like, for recording still images and moving images in a memory card, serving as a recording medium, which has a solid-state memory device have already been available on the market. Electronic cameras comprising a function for performing automatic white balance correction at the time of image sensing are also available.

In these electronic cameras, even in a case where color balance of a sensed image is deteriorated due to the type of a light source used at an image sensing location, the camera automatically specifies the light source color and performs color balance correction. Therefore, an operator of the camera can obtain an image of appropriate colors without concerning about the light source color (e.g., refer to Japanese Patent Application Laid-Open No. 2000-350232).

According to the automatic white balance correction method adopted by such image sensing apparatuses, e.g., conventional electronic cameras, a portion which is expected to be white is extracted from a sensed image, and color balance of the extracted white portion is adjusted for correcting color balance of the overall image. However, when a white portion is extracted from a sensed image, there is a case that a chromatic color is erroneously detected as white, resulting in a problem of an inappropriate color balance in the corrected image.

SUMMARY OF THE INVENTION

The present invention has been made in consideration of the above situation, and has as its object to enable more appropriate detection of a desired color portion in a sensed image.

According to the present invention, the foregoing object is attained by providing an image processing method comprising: sensing an object without performing light projection with a light projection unit and acquiring a first image; sensing the object while performing light projection with the light projection unit and acquiring a second image; and extracting a pixel having a specific color from the first image based on the first image and the second image.

According to the present invention, the foregoing object is also attained by providing an image processing method comprising: before sensing a still image, sensing first and second images by an image sensing unit without performing and while performing light projection with a light projection unit, respectively, and calculating data used for white balance correction based on the first and second images; and performing white balance correction of a still image after sensing the still image in accordance with the calculated data used for white balance correction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 6 is a flowchart describing recording processing according to the embodiment of the present invention;

FIG. 7 is a flowchart describing Automatic White Balance (AWB) control processing according to the embodiment of the present invention;

FIGS. 9A to 9C are graphs showing a conception of white extraction processing according to the embodiment of the present invention; and FIG. 10 is a view showing an example of a primary color filter pattern and an example of a processing unit of the white extraction processing according to the embodiment of the present invention.

DETAILED DESCRIPTION OF THE PREFERRED EMBODIMENT

A preferred embodiment of the present invention will now be described in detail in accordance with the accompanying drawings.

Figure 1:
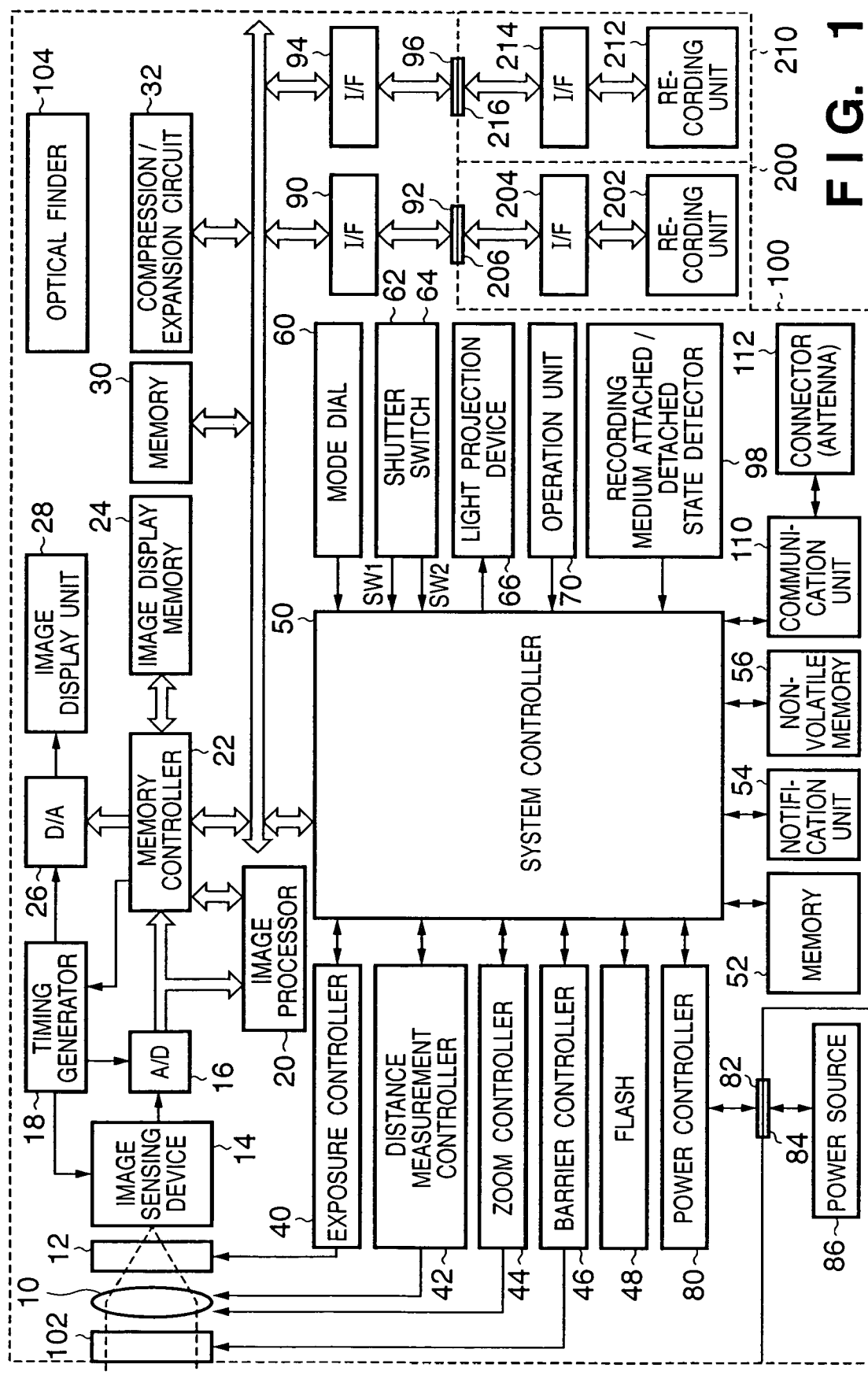
FIG. 1 is a block diagram showing a configuration of an image processing apparatus according to an embodiment of the present invention.

FIG. 1 is a block diagram showing a configuration of an image processing apparatus according to an embodiment of the present invention.

In FIG. 1, reference numeral 100 denotes an image processing apparatus according to the present embodiment. The image processing apparatus 100 may be any of a digital camera, a digital video camera, and a mobile terminal having a camera (including a mobile telephone having a camera). This embodiment describes a case where the image processing apparatus 100 is a digital camera.

In the image processing apparatus 100, numeral 10 denotes an image sensing lens; 12, a shutter having a diaphragm function; 14, an image sensing device which converts an optical image into an electric signal; 16, an A/D converter which converts an analog signal outputted from the image sensing device 14 into a digital signal.

Numeral 18 denotes a timing generator which supplies a clock signal and a control signal respectively to the A/D converter 16 and a D/A converter 26, under the control of a memory controller 22 and a system controller 50.

Numeral 20 denotes an image processor which performs predetermined pixel interpolation processing, color conversion processing and the like on image data from the A/D converter 16 or image data from the memory controller 22. The image processor 20 performs predetermined calculation processing using the image data outputted from the A/D converter 16, and the system controller 50 performs through-the-lens (TTL) auto focus (AF) processing, auto exposure (AE) processing, pre-flash (EF) processing with respect to an exposure controller 40 and a distance measurement controller 42, based on the result of calculations. Further, the image processor 20 performs predetermined calculation using the image data outputted from the A/D converter 16, and performs TTL auto white balance (AWB) processing, based on the result of calculations.

The memory controller 22 controls the A/D converter 16, the timing generator 18, the image processor 20, an image display memory 24, the D/A converter 26, a memory 30 and a compression/expansion circuit 32. The image data outputted from the A/D converter 16 is written into the image display memory 24 or the memory 30 via the image processor 20 and the memory controller 22, or only via the memory controller 22.

Numeral 24 denotes an image display memory; 26, a D/A converter; and 28, an image display unit comprising a liquid crystal display (LCD) or the like. Image data written into the image display memory 24 is displayed on the image display unit 28 via the D/A converter 26.

An electronic finder function can be realized by sequentially displaying sensed images on the image display unit 28. Further, image display unit 28 can turn ON/OFF its display in accordance with an instruction from the system controller 50. When the display of the image display unit 28 is turned OFF, the electric consumption of the image processing apparatus 100 can be greatly reduced. Further, the image display unit 28 displays information regarding a focus state, a camera-shake state, a flash charge state, shutter speed, an f number (aperture), exposure compensation and so on in accordance with an instruction from the system controller 50.

The memory 30, used for storing obtained still images and moving images, has a sufficient storage capacity for storing a predetermined number of still images and a moving image for a predetermined period. In sequential image sensing to sequentially obtain a plural number of still images or panoramic image sensing, a large amount of image data can. be written into the memory 30 at high speed. Further, the memory 30 may be used as a work area for the system controller 50.

The compression/expansion circuit 32 has a function for compressing image data read from the memory 30 by a predetermined image compression method (adaptive discrete cosine transformation (ADCT) or the like) and writing the compressed image data in the memory 30, and a function for expanding image data read from the memory 30 and writing the expanded image data in the memory 30.

The exposure controller 40 controls the shutter 12 having the diaphragm function. The exposure controller 40 interlocked with a flash 48 also has a flash adjusting function. The distance measurement controller 42 controls focusing of the image sensing lens 10. Numeral 44 denotes a zoom controller which controls zooming of the image sensing lens 10. Numeral 46 denote a barrier controller which controls the operation of a barrier 102 to protect the lens. The flash 48 has an AF auxiliary light projection function and a flash adjusting function. The system controller 50 controls the exposure controller 40 and the distance measurement controller 42 by the TTL method, in accordance with the result of calculations by the image processor 20 based on the image data from the A/D converter 16.

The system controller 50 controls the overall image sensing apparatus 100. Memory 52 stores the constants, variables, and programs for operation of the system controller 50.

Numeral 54 denotes a notification unit, such as a display device and a speaker, which notifies operating statuses, messages and the like to the user by using texts, images, sound and the like, in correspondence with execution of a program by the system controller 50. The notification unit 54 is provided in a single or plural visually-recognizable positions around the operation unit of the image processing apparatus 100. The notification unit 54 comprises, for instance, a combination of an LCD, an LED, and a sound generating device. Further, a part of functions of the notification unit 54 is provided within an optical finder 104.

The display contents of the notification unit 54, displayed on the LCD or the like, include indication of single shot/sequential image sensing, a self timer, a compression rate, the number of recording pixels, the number of recorded images, the number of recordable images, shutter speed, an f number (aperture), exposure compensation, flash illumination, pink-eye effect mitigation, macro image sensing, a buzzer-set state, a timer battery level, a battery level, an error state, information using plural digit numbers, attached/detached status of recording media 200 and 210, operation of communication I/F, and date and time.

Further, the display contents of the notification unit 54, displayed within the optical finder 104, include a focus state, a camera shake warning, a flash charge state, the shutter speed, the f number (aperture), and the exposure compensation.

Numeral 56 denotes an electrically erasable and recordable nonvolatile memory such as an EEPROM.

Numerals 60, 62, 64 and 70 denote operation means for inputting various operation instructions to the system controller 50, comprising a single or plurality of combinations of switches, dials, touch panels, a device for pointing by line-of-sight detection, a voice recognition device, and the like.

Next, the operation means will be described in more detail.

Numeral 60 denotes a mode dial switch for selecting various function modes such as a power OFF mode, an automatic image sensing mode, an image sensing mode, a panoramic image sensing mode, a reproduction mode, a multi-image reproduction/deletion mode, and a PC connection mode.

Numeral 62 denotes a shutter switch SW1 turned ON by half stroke of a shutter button (not shown), to instruct start of the operations of the AF processing, the AE processing, the AWB processing, the EF processing and the like.

Numeral 64 denotes a shutter switch SW2 turned ON by full stroke of the shutter button (not shown), to instruct start of a series of operations of exposure processing to write a signal read from the image sensing device 14 into the memory 30, via the A/D converter 16 and the memory controller 22, development processing by using calculations by the image processor 20 and the memory controller 22, and recording processing to read the image data from the memory 30, compress the image data by the compression/expansion circuit 32, and write the compressed image data into the recording medium 200 or 210.

Numeral 70 denotes an operation unit comprising various buttons and touch panels including a menu button, a set button, a macro/non-macro selection button, a multi-image reproduction/repaging button, a flash setting button, a single-shot/sequential/self-timer image sensing selection button, a forward (+) menu item selection button, a backward (−) menu item selection button, a forward (+) reproduction image search button, a backward (−) reproduction image search button, an image sensing quality selection button, an exposure compensation button, and a date/time set button.

Numeral 66 denotes a light projection device for projecting light on an object, which is used for white pixel detection that will be described later.

Numeral 80 denotes a power controller comprising a battery detection circuit, a DC-DC converter, a switch circuit to select the block to be energized and the like. The power controller 80 detects the attached/detached state of the battery, the battery type and the remaining battery power level, controls the DC-DC converter based on the results of detection and an instruction from the system controller 50, and supplies a necessary voltage to the respective parts including the recording medium for the necessary period.

Numerals 82 and 84 denote connectors; and 86, the power source comprising a primary battery such as an alkaline battery or a lithium battery, a secondary battery such as an NiCd battery, an NiMH battery or an Li battery, an AC adapter, and the like.

Numerals 90 and 94 denote interfaces for recording media such as a memory card or a hard disk; 92 and 96, connectors for connection with the recording media such as a memory card or a hard disk; 98, a recording medium detector for detecting whether recording medium 200 and/or 210 is attached to the connector 92 and/or connector 96.

In the present embodiment, two systems of interfaces and connectors for connection with the recording media are employed. However, the number of systems is not limited, and a single or plurality of systems of interfaces and connectors may be provided. Further, interfaces and connectors pursuant to different standards may be combined.

As the interfaces and connectors, those in conformity with Personal Computer Memory Card International Association standards (PCMCIA cards) and cards in conformity with compact flash (CF) (registered trademark) card standards may be used. In a case where interfaces and connectors in conformity with the PCMCIA standards, CF card standards and the like are used as the interfaces 90 and 94 and the connectors 92 and 96, image data and management information attached to the image data are transmitted to or received from other peripheral devices such as a computer and a printer by connection of various communication cards such as a LAN card, a modem card, a USB card, an IEEE 1394 card, a P1284 card, an SCSI card and a PHS card.

The barrier 102 covers the image sensing portion of the image sensing apparatus 100 including the lens 10, thus prevents contamination and breakage of the image sensing portion.

The optical finder 104 can be used for image sensing without the electronic finder function of the image display unit 28. In the optical finder 104, realized are some of the functions of the notification unit 54 including the indication of focus state, the camera shake warning, the flash charge state, the shutter speed, the f number (aperture), the exposure compensation and the like.

A communication unit 110 has various communication functions for RS232C, USB, IEEE 1394, P1284, SCSI, modem, LAN, and wireless communication.

A connector/antenna 112 functions as a connector when the image processing apparatus 100 is connected to another device via the communication unit 110, and as an antenna for wireless communication.

Numerals 200 and 210 are recording media such as a memory card, a hard disk or the like. The recording media 200 and 210 respectively have the recording units 202 and 212 constructed with a semiconductor memory, a magnetic disk or the like, the interfaces 204 and 214 for communication with the image processing apparatus 100, and the connectors 206 and 216 for connection with the image processing apparatus 100.

Next, an operation of the image processing apparatus 100 having the above-described configuration in the present embodiment is described with reference to FIGS. 2 to 6.

Figure 2:
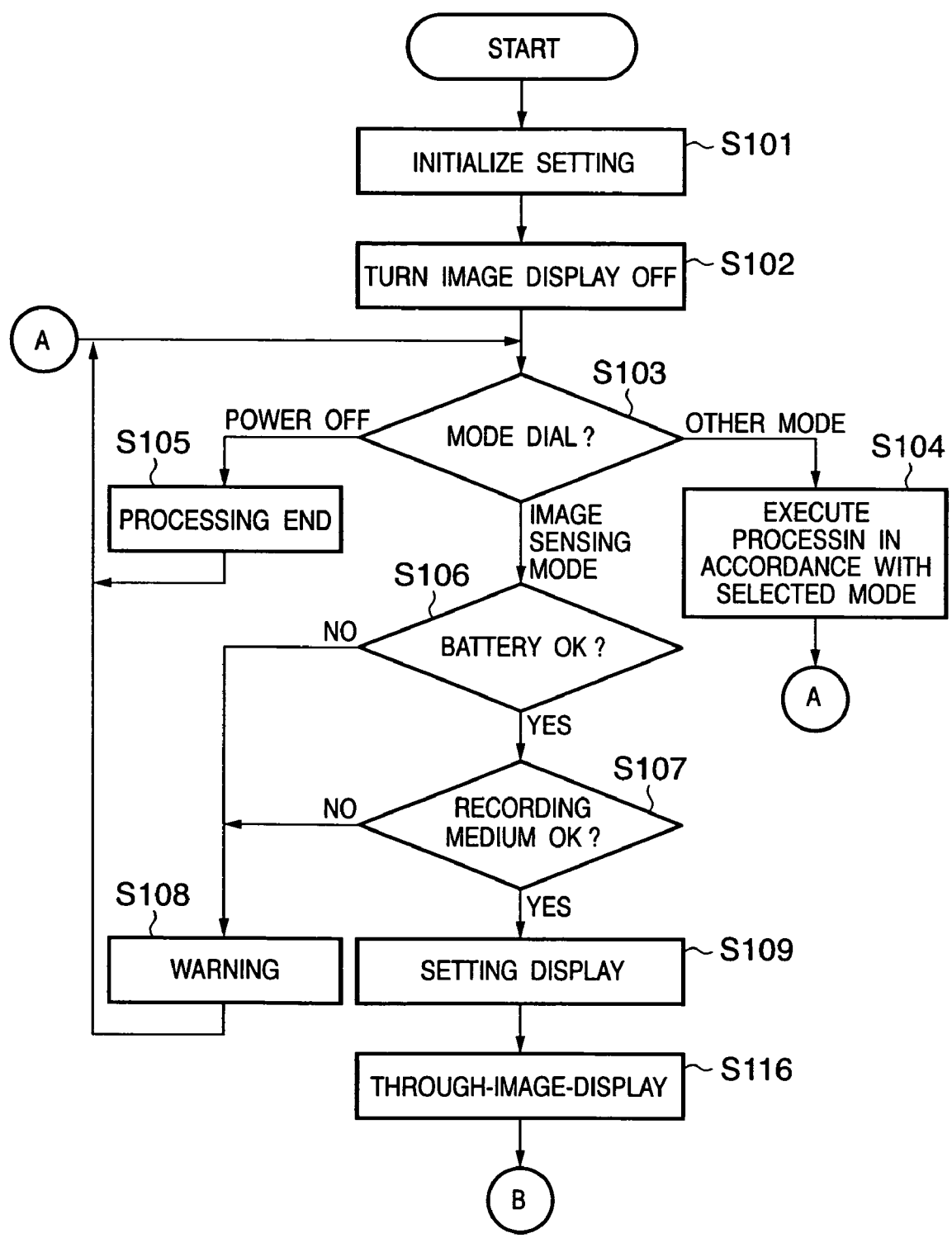
FIG. 2 is a flowchart describing a main routine of the image processing apparatus according to the embodiment of the present invention.
Figure 3:
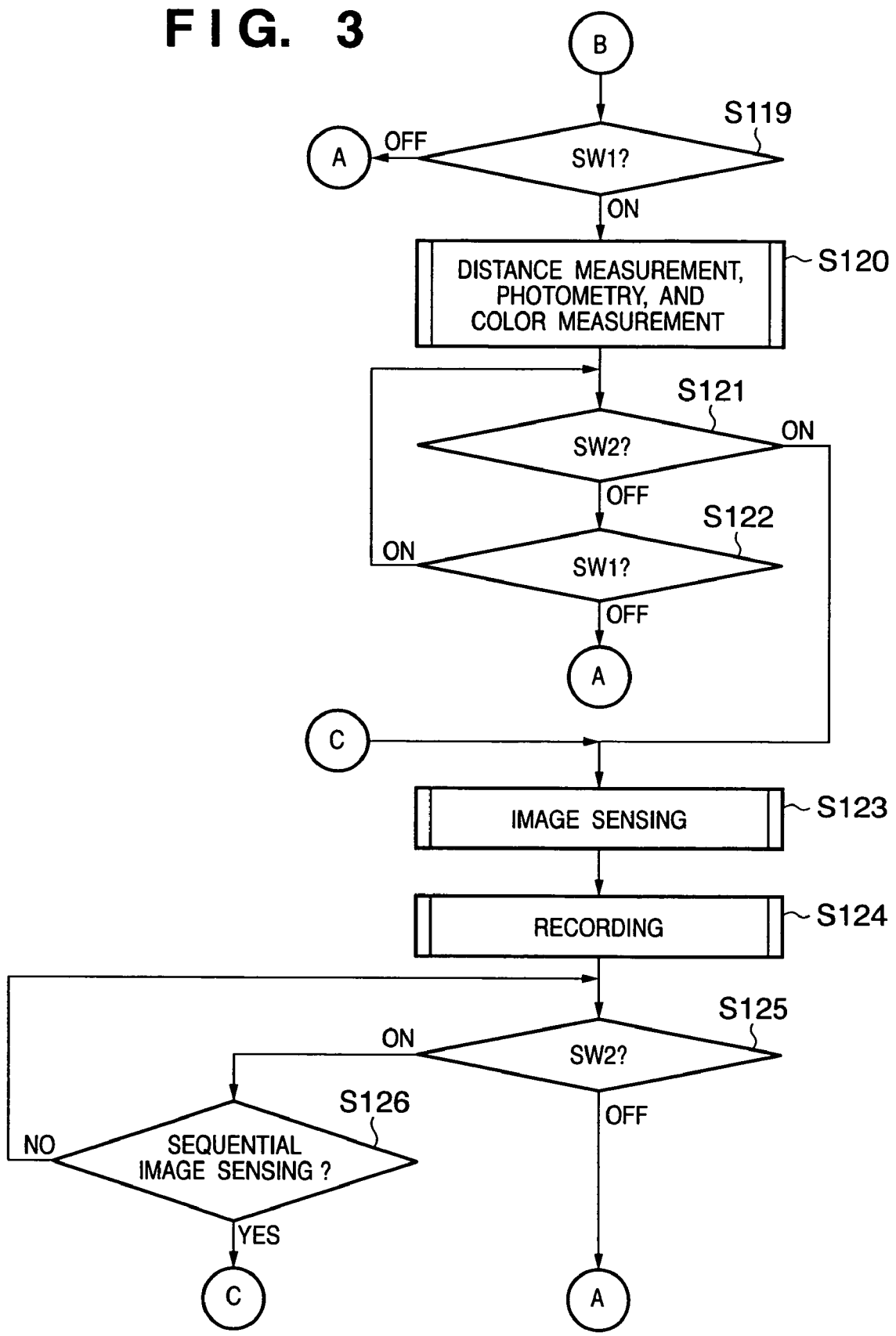
FIG. 3 is a flowchart describing the main routine of the image processing apparatus according to the embodiment of the present invention.

FIGS. 2 and 3 are flowcharts describing a main routine of the image processing apparatus according to the present embodiment.

Referring to FIG. 2, upon application of power, e.g., battery exchange, the system controller 50 initializes flags, control variables and the like (step S101), and initializes the image display setting of the image display unit 28 to an OFF state (step S102).

In step S103, the system controller 50 determines the setting position of the mode dial 60. If the mode dial 60 is set in the power-OFF state, predetermined end processing is performed (step S105), which includes: changing the display state of each display unit to an end state, closing the barrier 102 to protect the image sensing portion, recording necessary parameters and setting values including flags and variables, as well as setting modes in the non-volatile memory 56, and cutting off unnecessary power supply to respective units of the image processing apparatus 100 including the image display unit 28 by the power controller 80. Then, the control returns to step S103.

Meanwhile, if the mode dial 60 is set in other mode in step S103, the system controller 50 executes processing in accordance with the selected mode (step S104). Upon completion of the processing, the control returns to step S103.

If the mode dial 60 is set in an image-sensing mode in step S103, the control proceeds to step S106.

In step S106, the system controller 50 determines by the power controller 80 whether or not the operating state and the remaining level of the power source 86 constructed with a battery or the like cause any problems in operation of the image processing apparatus 100. If there is a problem (NO in step S106), predetermined warning indication is given by the notification unit 54 using an image or sound (step S108), and the control returns to step S103.

If there is no problem in the power source 86 (YES in step S106), the system controller 50 determines whether or not the operating state of the recording medium 200 or 210 causes any problems in operation of the image processing apparatus 100, particularly in reproduction operation of the image data recorded in the recording medium 200 or 210. If there is a problem (NO in step S107), predetermined warning indication is given by the notification unit 54 using an image or sound (step S108), and the control returns to step S103.

If there is no problem in the operation state of the recording medium 200 or 210 (YES in step S107), various setting states of the image processing apparatus 100 are notified to the user by the notification unit 54 using an image or sound (step S109). Note that in a case where the image display of the image display unit 28 is ON, various setting states of the image processing apparatus 100 may be notified to the user by the image display unit 28 using an image or sound.

In step S116, the system controller 50 sets a through-image-display state, in which sensed image data is sequentially displayed.

In the through-image-display state, an electronic finder function is realized by sequentially writing data in the image display memory 24 via the image sensing device 14, the A/D converter 16, the image processor 20 and the memory controller 22, and sequentially displaying the data on the image display unit 28 via the memory controller 22 and the D/A converter 26.

Note that in a case where the image display unit 28 is set in the OFF state according to an instruction of the system controller 50 as mentioned above, the through-image-display is not performed.

In step S119, the state of the shutter switch SW1 is checked. If the shutter switch SW1 is OFF, the control returns to step S103. If the shutter switch SW1 is ON, the control proceeds to step S120. In step S120, the system controller 50 adjusts the focus of the lens 10 to an object by performing distance measurement, and determines an f number (aperture) and shutter speed by performing photometry. As a result of photometry, if necessary a flash flag is set for flash activation. Detailed processing of distance measurement, photometry, and color measurement performed in step S120 will be described later with reference to FIG. 4.

Upon completion of the distance measurement, photometry, and color measurement processing (step S120), the control proceeds to step S121.

If the shutter switch SW2 is not depressed in step S121 and the shutter switch SW1 is released (OFF in step S122), the control returns to step S103. If the shutter switch SW2 is not depressed (OFF in step S121) but the shutter switch SW1 remains ON (ON in step S122), the control returns to step S121. If the shutter switch SW2 is depressed (ON in step S121), the control proceeds to step S123.

In step S123, the system controller 50 performs image sensing processing comprising exposure processing for writing sensed image data in the memory 30 via the image sensing device 14, the A/D converter 16, the image processor 20 and the memory controller 22, or directly via the A/D converter 16 and the memory controller 22, and development processing for performing various processing by reading image data written in the memory 30 via the memory controller 22 and, as necessary, the image processor 20. Note that details of the image sensing processing performed in step S123 will be described later with reference to FIG. 5.

Upon completion of the image sensing processing in step S123, the control proceeds to step S124. The system controller 50 reads the sensed image data written in the memory 30 to perform various image processing using the memory controller 22 and, as necessary, the image processor 20, and performs image compression in accordance with a set mode using the compression/expansion circuit 32, then executes recording processing for writing image data in the recording medium 200 or 210 (step S124). Details of the recording processing in step S124 will be described later with reference to FIG. 6.

Upon completion of the recording processing in step S124, the state of the shutter switch SW2 is checked in step S125. If the shutter switch SW2 is OFF, the control returns to step S103; whereas if the shutter switch SW2 is ON, the control proceeds to step S126 for determining whether or not a sequential image sensing mode is set. If a sequential image sensing mode is not set, the control returns to step S125 to await the release of the shutter switch SW2, and the control returns to step S103. If a continuous image sensing mode is set, the control returns to step S123 to perform next image sensing.

Figure 4:
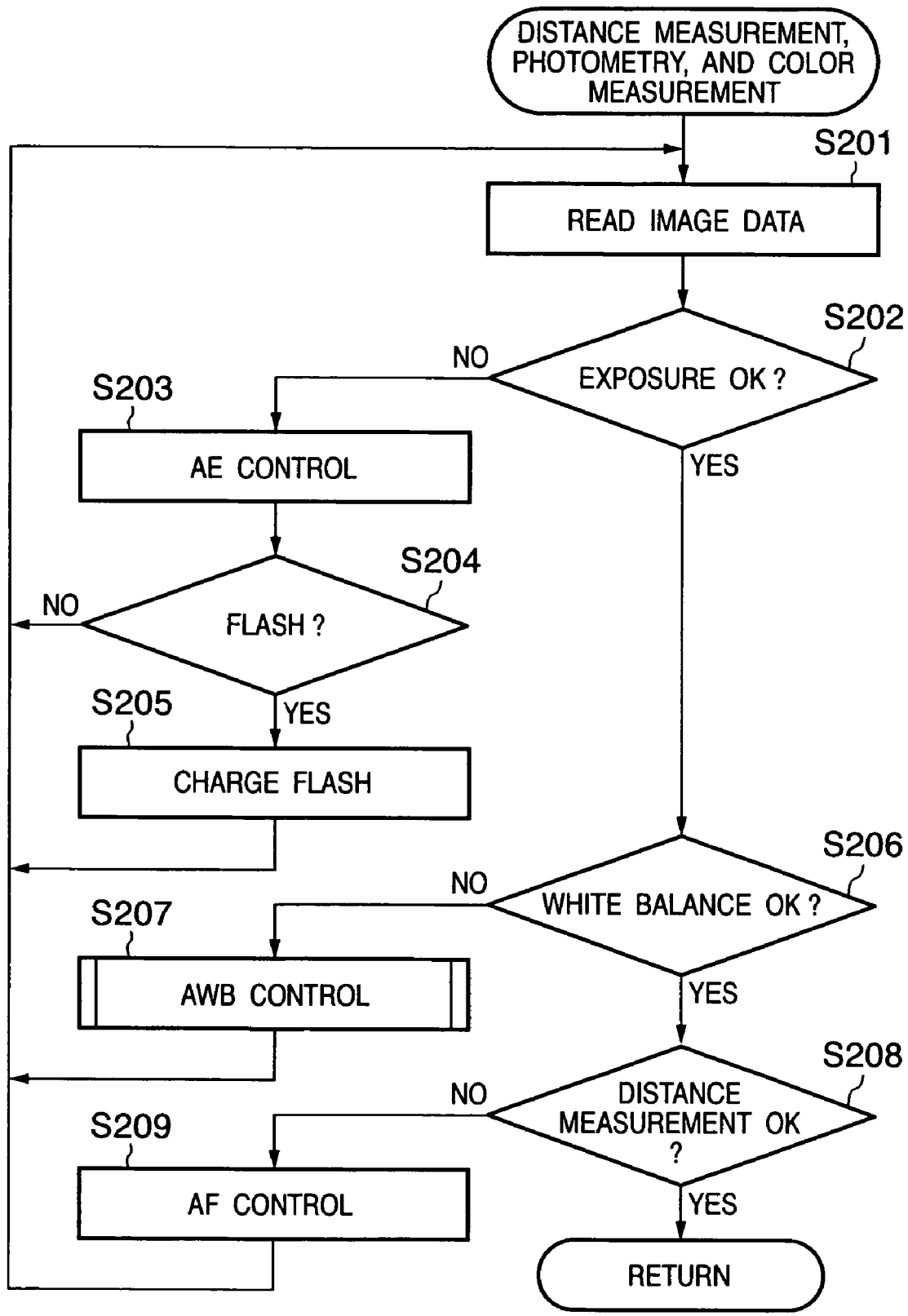
FIG. 4 is a flowchart describing distance measurement, photometry and color measurement processing according to the embodiment of the present invention.

FIG. 4 is a flowchart describing details of distance measurement, photometry, and color measurement processing performed in step S120 in FIG. 3.

In step S201, the system controller 50 reads a charge signal from the image sensing device 14 and sequentially reads the image data into the image processor 20 via the A/D converter 16. Using the sequentially read image data, the image processor 20 performs predetermined calculation to be used in TTL AE processing, EF processing, and AF processing.

Note that, each of these processing performs calculation by extracting a necessary number of particular portions from the entire pixels of a sensed image as mentioned above. By virtue of this, it is possible to perform optimal calculation for each of the different evaluation modes for detecting respective focal points of the objects located in the center and in the left and right, in each of the TTL AE processing, EF processing, AWB processing, and AF processing.

The system controller 50 performs AE control using the exposure controller 40 (step S203) until the exposure (AE) is determined appropriate based on the calculation result of the image processor 20 (until YES is determined in step S202). In step S204, the system controller 50 determines whether or not a flash is necessary based on the photometry data obtained by AE control in step S203. If a flash is necessary, a flash flag is set and the flash 48 is charged (step S205), then the control returns to step S201. If a flash is not necessary, the control directly returns to step S201.

When the exposure (AE) is determined appropriate (YES in step S202), the photometry data and/or setting parameters are set in the internal memory of the system controller 50 or the memory 52.

Next, with the use of the calculation results of the image processor 20 and the photometry data obtained by the AE control, the system controller 50 performs AWB control (step S207) by adjusting parameters of color processing using the image processor 20 until the white balance is determined appropriate (during NO in step S206). The AWB control will be described later in detail with reference to FIG. 7.

When the white balance is determined appropriate (YES in step S206), the white balance correction data (white balance gain) is stored in the internal memory of the system controller 50 or the memory 52, then the control proceeds to step S208.

In step S208, the system controller 50 performs AF control (step S209) using the distance measurement controller 42 based on the measurement data obtained by AE control and AWB control, for instance, a luminance color difference obtained from each gain of the R, G and B white balance correction data, until the distance measurement (AF) achieves a focused state (during NO in step S208).

When a focused state is achieved in distance measurement (AF) (YES in step S208), the measurement data and/or setting parameters are stored in the internal memory of the system controller 50 or the memory 52. Then, the distance measurement, photometry, and color measurement processing routine S120 ends.

Figure 5:
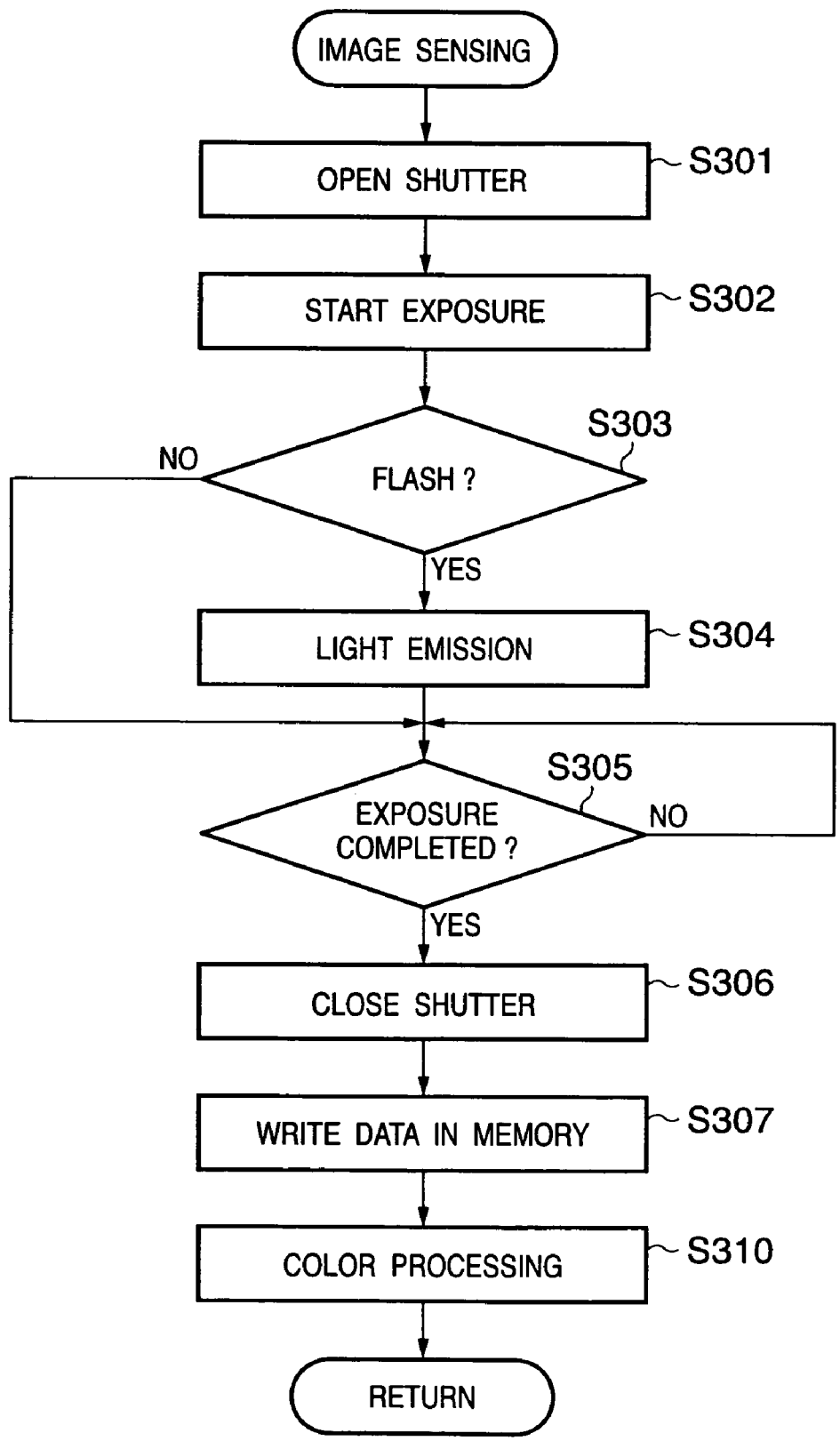
FIG. 5 is a flowchart describing image sensing processing according to the embodiment of the present invention.

FIG. 5 is a flowchart describing details of the image sensing processing performed in step S123 in FIG. 3.

In accordance with the photometry data stored in the internal memory of the system controller 50 or the memory 52 as described in FIG. 4, the system controller 50 controls the exposure controller 40 to release the shutter 12 having a diaphragm function in accordance with the f number (step S301), and starts exposure of the image sensing device 14 (step S302).

Next, it is determined whether or not the flash 48 is necessary based on the flash flag (step S303). In a case where the flash is necessary, the control proceeds to step S304 for emission of the flash 48. In a case where the flash is not necessary, the control proceeds to step S305 without emission of the flash 48.

The system controller 50 awaits exposure completion of the image sensing device 14 in accordance with the photometry data (step S305). After a lapse of the exposure time, the control proceeds to step S306 to close the shutter 12. A charge signal from the image sensing device 14 is read, and image data is written in the memory 30 via the A/D converter 16, the image processor 20 and the memory controller 22, or directly via the A/D converter 16 and the memory controller 22 (step S307).

In step S310, color processing is sequentially performed in accordance with the set image sensing mode, and the processed image data is written in the memory 30.

After the series of processing is completed, the image sensing processing routine (step S120) ends.

FIG. 6 is a flowchart describing details of the recording processing performed in step S124 in FIG. 3.

The system controller 50 reads image data written in the memory 30 using the memory controller 22 and, as necessary, the image processor 20, and performs image compression processing corresponding to the set mode using the compression/expansion circuit 32 (step S402). Then, the system controller 50 writes the compressed image data in the recording medium 200 or 210, e.g., a memory card or a compact flash (registered trademark) card, via the interface 90 or 94 and the connector 92 or 96 (step S403). Upon completion of the data writing in the recording medium, the recording processing routine (step S124) ends.

FIG. 7 is a flowchart describing details of the AWB control processing performed in step S207 in FIG. 4.

In step S501, the system controller 50 reads a charge signal from the image sensing device 14 and transmits the sensed image data to the image processor 20 via the A/D converter 16. Based on the read image data, the luminance of the object is calculated using the calculation result of the image processor 20 and information regarding the aperture and shutter speed obtained in step S203. If the luminance of the object is less than a predetermined value (YES in step S502), light is projected on the object by the light projection device 66 (step S503). Then, a charge signal from the image sensing device 14 is read and the sensed image data is transmitted to the image processor 20 via the A/D converter 16 (step S504).

In step S505, a difference between the pre-light-projection image obtained in step S501 and the post-light-projection image obtained in step S504 is calculated. Herein, the following subtraction is performed with respect to each pixel:

(pixel value of post-light-projection image)−(pixel value of pre-light-projection image)

In a case where the image sensing device 14 is covered with a primary color filter, let the differences for respective colors obtained by the subtraction be $\Delta R$, $\Delta G$, and $\Delta B$, a specific color can be extracted by determining whether or not each of the differences falls within a predetermined range. Since white balance control is performed herein, the following description is given on a case of detecting a pixel having white color (hereinafter referred to as a "white pixel").

In order to define white color, light is projected by the light projection device 66 on an object having reference white color in advance at the factory to capture the image, and the reference levels Rw, Gw, and Bw of respective colors R, G and B are stored in the non-volatile memory 56. In step S506, the reference levels Rw, Gw, and Bw are read out of the non-volatile memory 56. In step S507, if the differences $\Delta R$, $\Delta G$, and $\Delta B$ obtained in step S505 fall within the predetermined ranges that base upon the reference levels Rw, Gw, and Bw specified by following condition (1), the color of the pixel is determined as white, and the pixel is extracted as a white pixel.

$$0.9 \times Rw < \Delta R < 1.1 \times Rw$$

$$0.9 \times Gw < \Delta G < 1.1 \times Gw$$

$$0.9 \times Bw < \Delta B < 1.1 \times Bw \quad (1)$$

The concept of the above processing in steps S505 to S507 is described with reference to FIGS. 8A to 9C.

FIGS. 8A to 9C show a case where the reference levels Rw, Gw, and Bw stored in the non-volatile memory 56 are equal (1:1:1).

Figures 8A, 8B:
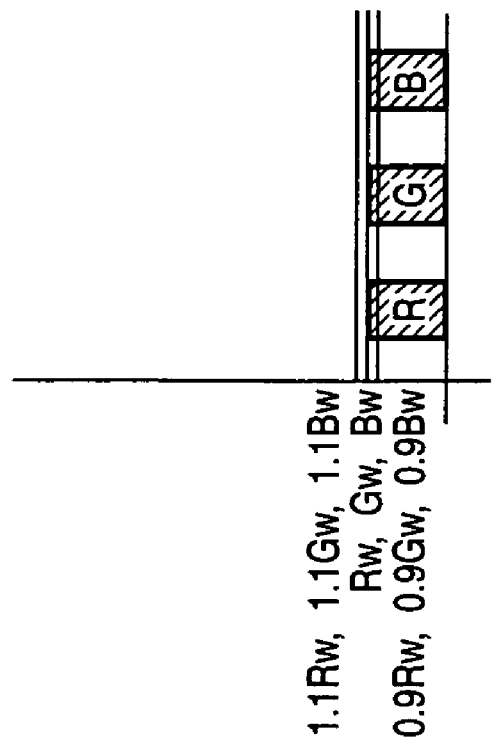
FIGS. 8A to 8C are graphs showing a conception of white extraction processing according to the embodiment of the present invention.
Figure 8C:
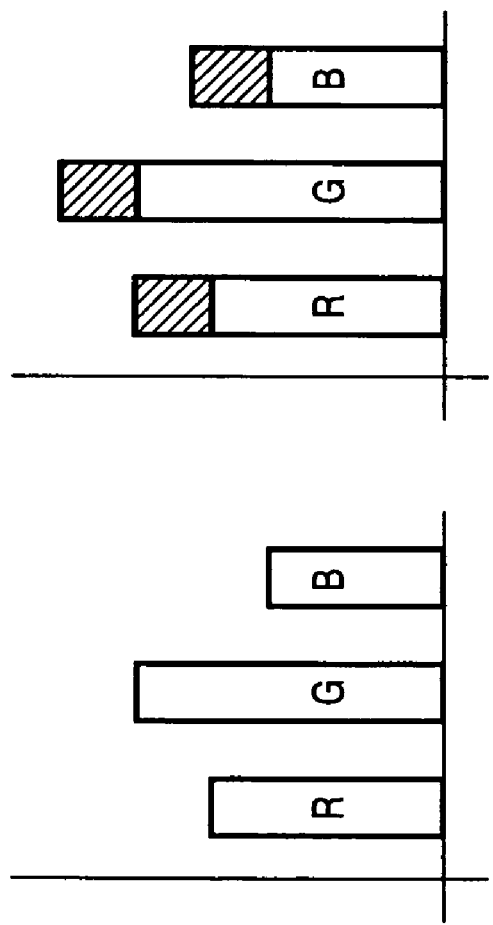

FIGS. 8A to 8C show a case of a white object. FIG. 8A shows pixel signals of a pre-light-projection image; FIG. 8B, pixel signals of a post-light-projection image; and FIG. 8C, differences of pixel signals between the pre-light-projection image and the post-light-projection image, namely, reflected light components of the light projection device 66 included in the pixel signals shown in FIG. 8B. As shown in the drawing, since the differences of pixel signals shown in FIG. 8C are approximately equal to the reflected light levels Rw, Gw, and Bw (each falls within the range satisfying the above condition (1)) stored in the non-volatile memory 56, the pixel of interest can be determined as white.

Meanwhile, FIGS. 9A to 9C show a case of an object having a chromatic color. As similar to FIGS. 8A to 8C, FIG. 9A shows pixel signals of a pre-light-projection image; FIG. 9B, pixel signals of a post-light-projection image; and FIG. 9C, differences of pixel signals between the pre-light-projection image and the post-light-projection image, namely, reflected light components of the light projection device 66 included in the pixel signals shown in FIG. 9B. In this case, since the differences of pixel signals between the pre-light-projection image and the post-light-projection image are not equal to the reflected light levels Rw, Gw, and Bw ($\Delta G$ falls within the range defined by the condition (1), but $\Delta R$ and $\Delta B$ are outside the range) stored in the non-volatile memory 56, the pixel of interest can be determined as not white.

The system controller 50 performs the above-described white determination processing with respect to all pixels of the image, extracts white pixels, and the control proceeds to step S509.

Note that in a case where the image sensing device 14 is covered with a primary color filter, for instance, having a Bayer pattern shown in FIG. 10, the white pixel extraction may be performed in units of four pixels of R, G, G, and B enclosed in the bold line in FIG. 10, instead of in units of each pixel. The unit to be used for white pixel extraction is not limited to four pixels, but the combination of pixels may be changed as appropriate in accordance with the pattern of the color filter. Furthermore, it is also possible to perform the above-described white pixel extraction after color interpolation is performed so as to render each pixel have R, G, and B data.

Meanwhile, in step S502, if it is determined that the luminance of the object is equal to or larger than a predetermined value (NO in step S502), white pixels are extracted by a conventional method without projecting light in step S508 since an influence of external light may be too large to obtain sufficient reflection light of the light projection device 66. Then, the control proceeds to step S509.

In step S509, integration values Rsum, Gsum, and Bsum are obtained by adding all the white pixels for each color extracted in step S507 or S508. In step S510, white balance gains Rgain, Ggain, and Bgain are obtained based on the integration values of the white pixels by the following equations (2):

$$R\text{gain} = R\text{sum}/((R\text{sum} + G\text{sum} + B\text{sum})/3)$$

$$G\text{gain} = G\text{sum}/((R\text{sum} + G\text{sum} + B\text{sum})/3)$$

$$B\text{gain} = B\text{sum}/((R\text{sum} + G\text{sum} + B\text{sum})/3) \quad (2)$$

After the white balance gains are obtained in step S510, the control returns to step S207 in FIG. 4. By using the white balance gains obtained in step S510, the R, G, and B signals are converted to YCrCb signals by the following equation (3):

$$\begin{bmatrix} Y \\ Cr \\ Cb \end{bmatrix} = \begin{bmatrix} a & b & c & d \\ e & f & g & h \\ i & j & k & l \end{bmatrix} \begin{bmatrix} R \times Rgain \\ G \times Ggain \\ B \times Bgain \end{bmatrix} \quad (3)$$

Note in the above equation (3), reference letters a to l are constants determined by spectral sensitivity of the CCD. When the CrCb signals of the white pixels extracted in step S507 or S508 are 0 altogether, it can be concluded that the white pixels are correctly reproduced in white. Therefore, it is determined that the white balance processing is appropriate.

When the white balance is appropriate in step S206, it is stored in the internal memory of the system controller 50 or the memory 52, and used in color processing in step S310 in FIG. 5 at the time of image sensing.

As described above, by performing image processing (white balance correction) based on the white balance gains of the three colors, an image having appropriate color balance can be obtained.

Note that the acquisition method of the white balance correction value is not limited to the above-described method, but other methods may be employed. For instance, the following method may be employed. First, white balance correction values corresponding to each color temperature of a light source are stored in advance in the non-volatile memory 56 or the like, then a color temperature of the light source is detected by a known method using a pixel signal (e.g., a signal shown in FIG. 8A) of the white pixel extracted in step S507 or S508, which is not subjected to light projection by the light projection device 66, and a white balance correction value is selected in accordance with the detected color temperature.

Furthermore, in the description of the above embodiment, the white pixel extraction method is changed in a case where the luminance is less than a predetermined value and a case where the luminance is equal to or larger than the predetermined value. However, in a case where the sufficient light projection amount of the light projection device 66 can be obtained, white pixel extraction can be performed by always projecting light by the light projection device 66.

Moreover, in the above embodiment, white balance gains are calculated in step S207. However, the present invention is not limited to this, and the positions of the white pixels in the object to be sensed are determined in step S207, and after a still image is sensed, white balance gains are calculated from the still image by using the determination result.

Further, in the above embodiment, white pixels are extracted for extracting a pixel having a predetermined color for white balance. However, pixels to be extracted are not limited to white pixels. Pixels of a desired chromatic color may be extracted by setting Rw, Gw, and Bw in desired values, and color balance of the chromatic color may be adjusted.

Other Embodiments

The present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion-board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-002106 and filed on Jan. 7, 2004, which is hereby incorporated herein by reference herein.

What is claimed is:

1. An image processing method comprising:
sensing an object without performing light projection with a light projection unit and acquiring a first image expressed with a plurality of colors;
sensing the object while performing light projection with the light projection unit and acquiring a second image expressed with a plurality of colors;
extracting pixels at which chromatic differences of the respective colors between the first image and the second image fall within a predetermined range;
calculating a sum pixel value of the extracted pixels for each of the plurality of colors; and
calculating, for each of the plurality of colors, a correction value for a color balance processing of a still image based on a ratio of the sum pixel value of each of the plurality of colors of the extracted pixels to a value obtained by averaging total value of the sum pixel values of all of the plurality of colors of the extracted pixels by the number of the plurality of colors.

2. The image processing method according to claim 1, wherein in said extraction, obtaining, in pixel unit, a difference between a pixel value of the first image and a pixel value of the second image; and in a case where the difference falls within the predetermined range set in advance, extracting a corresponding pixel as a pixel having at least one of a white color and a chromatic color.

3. The image processing method according to claim 2, wherein the predetermined range is set based on a pixel value of an object in an image, which is sensed in advance by performing light projection with the light projection unit on the object which has at least one of a white color and a chromatic color to be extracted.

4. The image processing method according to claim 3, wherein the pixel value of the object in the image is stored in a storage unit, and said extraction step comprises reading the pixel value out of the storage unit.

5. The image processing method according to claim 1, further comprising:
obtaining a luminance of the object based on the first image; and controlling to execute said extraction step in a case where the luminance is lower than a predetermined luminance.

6. The image processing method according to claim 1, wherein the color balance processing is a white balance processing of the still image.

7. An image processing apparatus comprising:
an image sensing unit including a plurality of pixels that senses an image expressed with a plurality of colors;
a light projection unit;
an extraction unit that extracts pixels at which chromatic differences of the respective colors between a first image and a second image fall within a predetermined range, said first image being sensed by said image sensing unit without performing light projection on an object with said light projection unit, and said second image being sensed by said image sensing unit while performing light projection on the same object with said light projection unit;
a calculation unit that calculates a sum pixel value of the extracted pixels for each of the plurality of colors; and
a second calculation unit that calculates, for each of the plurality of colors, a correction value for a color balance processing of a still image based on a ratio of the sum pixel value of each of the plurality of colors of the extracted pixels to a value obtained by averaging total value of the sum pixel values of all of the plurality of colors of the extracted pixels by the number of the plurality of colors.

8. The image processing apparatus according to claim 7, wherein said extraction unit obtains, in pixel unit, a difference between a pixel value of the first image and a pixel value of the second image, and in a case where the difference falls within the predetermined range set in advance, said extraction unit extracts a corresponding pixel as a pixel having at least one of a white color and a chromatic color.

9. The image processing apparatus according to claim 8, wherein the predetermined range is set based on a pixel value of an object in an image, which is sensed in advance by performing light projection with the light projection unit on the object which has at least one of a white color and a chromatic color to be extracted.

10. The image processing apparatus according to claim 9, further comprising a of the object in the image storage unit that stores the pixel value.

11. The image processing apparatus according to claim 7, further comprising: a luminance detection unit that obtains a luminance of the object based on the first image; and a control unit that controls to drive said extraction unit in a case where the luminance is lower than a predetermined luminance.

12. The image processing apparatus according to claim 7, wherein the color balance processing is a white balance processing of the still image.

13. A computer-readable medium including a program stored thereon, the program when executed by an information processing apparatus causing the information processing apparatus to perform the image processing method as set forth in claim 1.

* * * * *